United States Patent Office.

IMPROVED CONDENSED EXTRACT OF MALT.

THOMAS HAWKS, OF ROCHESTER, NEW YORK.

Letters Patent No. 60,370, dated December 11, 1866.

The Schedule referred to in these Letters Patent and making part of the same.

TO ALL WHOM IT MAY CONCERN:

Be it known that I, THOMAS HAWKS, of Rochester, in the county of Monroe, and State of New York, hav invented a new and improved method of producing a Condensed Extract of Malt; and I hereby declare that the following is a full and exact description thereof.

The object of my invention is to reduce or condense the infusion of malt to a solid or nearly solid substance, without deterioration, to the peculiar qualities of that material, for the purpose of rendering the product a portable and merchantable article, and also of ensuring the preservation of its properties against the changes produced by time, and the effect of changes of climate and temperature. The substance, so prepared, is designed to be used for the ready and expeditious production of beer, ale, and other similar beverages, by the addition of water and yeast in suitable proportions, and subjecting to the proper temperature to produce fermentation. I have devoted much time and expense in experimenting to determine the best method of securing this result. I find that the process of evaporating by heat in open vessels, in which the infusion is exposed to the ordinary pressure of the atmosphere becomes impracticable for the following reasons:

1. The evaporation of the aqueous portion of the infusion takes place so slowly that fermentation sets in, injuring, if not destroying, the properties of the malt before desiccation is effected.

2. If the temperature be increased to make the evaporation more rapid, the high heat, in combination with the oxygen of the atmosphere, decomposes a portion of the sacharine matter as the infusion becomes dense, changing it into caramel, an inert product incapable of vinous fermentation, and hence depriving the beverage produced from it in part of the sprightly effect and effervescence of alcohol and carbonic acid, and imparting a bitter, disagreeable flavor, and also discoloring it.

From these causes the production of a condensed extract of malt, which retains the virtues of those materials in a perfect state of preservation, cannot be effected by open evaporation, and hence condensation *in vacuo* is an essential feature of my invention, as by it special effects are obtained, making the product a new one, and possessing qualities that produce malt beverages of a better quality than is attainable by the ordinary method of brewing, as will hereafter be explained.

My process consists essentially in the following treatment:

An infusion of the malt is made by steeping with warm water (the temperature of which is 160° to 170° Farenheit, or thereabouts,) in a mash-tub of ordinary construction, which is drawn off and fresh water supplied to the malt repeatedly, until the strength is fully extracted. This liquor is then placed in a wooden tub, preferably lined with copper, and boiled with steam, or in a vessel of copper or of other suitable material. During the boiling common salt may be added in the proportion of four or five pounds to fifty bushels of malt, and the liquor clarified with gelatine in the usual manner. Boil three or four hours, or until thoroughly clarified, when the liquor is drawn off into a receiving-vessel which is connected with a vacuum-pan by a pipe or other suitable means; and as the air is exhausted from the pan the infusion flows in to supply its place. It is then subjected, while *in vacuo*, to a temperature of 130° to 150° Farenheit or thereabouts, for a sufficient length of time to condense it to a thick syrup of nearly solid consistence. In this state it is suitable for packing in kegs or vessels for preservation and transportation, as a portable and merchantable commodity, requiring the addition only of the requisite amount of water, the extract or infusion of hops, and yeast, to convert it into ale or other malt beverage.

Ale and other beverages produced from the extract thus condensed possess a finer flavor and more lively and effervescent qualities than that brewed in the ordinary manner; and this is explained by the fact that the malt and other vegetable extracts are preserved in greater perfection by evaporating the water which they contain at so low a temperature that they are not decomposed by the action of heat; and, air not being present during the process, the incipient fermentation is prevented from occurring; and thereby the saccharine and other fermentative properties remain unchanged in the condensed product, so that when it is converted into beer a superior quality is produced in consequence of the better quality of the material or stock employed.

This advantage of the process is peculiarly apparent in contrast with a like extract that is condensed by evaporating in the open air by boiling, and other applications of heat, as I have heretofore practiced; the result being that the saccharine matter was so far decomposed by the high temperature required as not only to impart a disagreeable flavor to the beer but to also to render it deficient in both alcohol and carbonic acid gas.

I claim condensing the extract or infusion of malt by evaporation *in vacuo* for the manufacture of ale, beer, and other liquors, substantially as set forth.

I also claim, as a new product, the extract of malt when condensed to a solid or nearly solid substance, substantially in the manner and for the purposes herein set forth.

I also claim, as a new product, the extract of malt, either with or without the addition of hops, when condensed *in vacuo*, substantially in the manner and for the purposes herein set forth.

In witness whereof I have hereunto signed my name in the presence of two subscribing witnesses.

THOMAS HAWKS.

Witnesses:
   GEORGE G. MUNGER,
   R. F. OSGOOD.